US010467514B1

(12) United States Patent
Soriano (10) Patent No.: US 10,467,514 B1
(45) Date of Patent: Nov. 5, 2019

(54) METHOD FOR COMBINING RFID TAGS (71) Applicant: Konica Minolta Laboratory U.S.A., Inc., San Mateo, CA (US)

(72) Inventor: Randy Cruz Soriano, San Leandro, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 16/197,766

(22) Filed: Nov. 21, 2018

(51) Int. Cl.
*G06K 19/07* (2006.01)
*G06K 19/077* (2006.01)
*G06K 19/04* (2006.01)

(52) U.S. Cl.
CPC ....... *G06K 19/0723* (2013.01); *G06K 19/041* (2013.01); *G06K 19/07* (2013.01); *G06K 19/0773* (2013.01); *G06K 19/0775* (2013.01); *G06K 19/07749* (2013.01); *G06K 19/07794* (2013.01)

(58) Field of Classification Search
CPC .. G06K 19/0723; G06K 19/07; G06K 19/041; G06K 19/07749; G06K 19/0775; G06K 19/0773; G06K 19/07794
See application file for complete search history.

(56) References Cited

U.S. PATENT DOCUMENTS

| 5,270,717 | A | * | 12/1993 | Schuermann | ......... | G01S 13/753 |
| | | | | | | 342/22 |
| 5,804,810 | A | * | 9/1998 | Woolley | ................ | G01S 5/0289 |
| | | | | | | 235/375 |
| 6,814,284 | B2 | * | 11/2004 | Ehlers | ................ | G06K 7/10178 |
| | | | | | | 235/383 |
| 7,170,415 | B2 | * | 1/2007 | Forster | ............... | G06K 17/0025 |
| | | | | | | 340/572.4 |
| 8,606,174 | B2 | * | 12/2013 | Forster | .............. | H04W 52/0229 |
| | | | | | | 455/7 |
| 2004/0174260 | A1 | * | 9/2004 | Wagner | .................. | G06Q 10/08 |
| | | | | | | 340/568.1 |
| 2005/0012616 | A1 | * | 1/2005 | Forster | ............... | G06K 19/0717 |
| | | | | | | 340/572.7 |
| 2005/0104572 | A1 | * | 5/2005 | Smith | ................ | G06K 19/0713 |
| | | | | | | 323/304 |

(Continued)

FOREIGN PATENT DOCUMENTS

| JP | 2010035789 A | 2/2010 |
| JP | 2010081276 A | 4/2010 |

(Continued)

*Primary Examiner* — Daniel I Walsh
(74) *Attorney, Agent, or Firm* — Squire Patton Boggs (US) LLP (57) ABSTRACT

RFID tags are combined in increase their range. A first RFID tag comprises a first chip and a first antenna configured to transmit data from the chip. The first RFID tag has a first initial range by which data may be obtained by an RFID reader from the first chip. A second RFID tag comprises a second chip and a second antenna configured to transmit data from the chip. The second RFID tag has a second initial range by which data may be obtained by an RFID reader from the second chip. A conductive path from first antenna to the second antenna is established to change initial ranges to modified ranges which are greater than the initial ranges.

18 Claims, 6 Drawing Sheets

(56) References Cited

U.S. PATENT DOCUMENTS

| | | | |
|---|---|---|---|
| 2005/0212674 A1* | 9/2005 | Desmons | G06K 19/07749 340/572.7 |
| 2006/0055541 A1* | 3/2006 | Bleckmann | G06K 19/027 340/572.7 |
| 2006/0061481 A1* | 3/2006 | Kurple | B60P 1/48 340/686.1 |
| 2006/0163350 A1* | 7/2006 | Melton | G06K 7/10336 235/435 |
| 2006/0163368 A1* | 7/2006 | Fogg | G06K 7/10178 235/492 |
| 2006/0208900 A1* | 9/2006 | Tavassoli Hozouri | G06K 19/07749 340/572.7 |
| 2007/0040686 A1* | 2/2007 | Reis | G06K 19/07718 340/572.7 |
| 2007/0146138 A1* | 6/2007 | Phipps | G06K 7/0008 340/572.7 |
| 2007/0222604 A1* | 9/2007 | Phipps | G06K 7/0008 340/572.7 |
| 2007/0262873 A1* | 11/2007 | Tsirline | G06K 7/10316 340/572.7 |
| 2008/0018434 A1* | 1/2008 | Carrender | G06K 7/0008 340/10.31 |
| 2008/0238682 A1* | 10/2008 | Kuwako | G06K 7/0008 340/572.4 |
| 2008/0291026 A1* | 11/2008 | Schwarze | G06K 19/07749 340/572.7 |
| 2009/0189768 A1* | 7/2009 | Copeland | G08B 13/2408 340/572.7 |
| 2009/0201157 A1* | 8/2009 | Forster | G06K 19/07749 340/572.7 |
| 2009/0206995 A1* | 8/2009 | Forster | G06K 19/0726 340/10.1 |
| 2010/0201520 A1* | 8/2010 | Stern | G01S 13/75 340/572.1 |
| 2010/0289627 A1* | 11/2010 | McAllister | G06Q 10/087 340/10.42 |
| 2011/0080271 A1* | 4/2011 | Kai | G06K 7/10 340/10.51 |
| 2011/0180609 A1* | 7/2011 | Sato | H01Q 1/2208 235/492 |
| 2011/0284641 A1* | 11/2011 | Yang | G06K 19/07786 235/492 |
| 2012/0126949 A1* | 5/2012 | Downie | G02B 6/3895 340/10.1 |
| 2012/0126950 A1* | 5/2012 | Downie | G02B 6/3895 340/10.1 |
| 2012/0223149 A1* | 9/2012 | Kato | H01Q 1/2216 235/492 |
| 2013/0134224 A1 | 5/2013 | Sabbah | |
| 2014/0167918 A1* | 6/2014 | Stern | G06K 7/0095 340/10.1 |
| 2017/0244167 A1* | 8/2017 | Mak | H01Q 1/2225 |

FOREIGN PATENT DOCUMENTS

| | | |
|---|---|---|
| JP | 2014016884 A | 1/2014 |
| WO | WO 2013/072578 A1 | 5/2013 |

\* cited by examiner

METHOD FOR COMBINING RFID TAGS

FIELD

This disclosure relates generally to RFID devices, more particularly, to modification of RFID tags.

BACKGROUND

Radio frequency identification (RFID) is a technology that works on radio frequency signals. An RFID system often comprises three main components: (1) an RFID tag which stores data is usually attached to an article that one desires to identify and/or track; (2) an RFID reader that communicates with the RFID tag using radio frequency signals to obtain data from the RFID tag; and (3) a host data processor that uses the data obtained by the RFID reader from the RFID tag. If the RFID tag is within range of the radio frequency signals (radio waves), a communication link between the two RFID devices is established and the RFID tag replies with data to the RFID reader. Based on this reply, the RFID reader may identify the article.

There are various types of RFID tags. Passive RFID tags do not include a power source, such as a battery. Passive RFID tags rely on power derived from radio waves from the RFID reader to transmit a reply to the RFID reader. Active RFID tags include a power source to power its internal circuitry and to enable transmission of a reply to the RFID reader. Semi-passive RFID tags include a power supply to power its internal circuitry but relies on power derived from the radio waves from the RFID reader to transmit a reply to the RFID reader.

An important factor is range, which refers to the maximum distance between the RFID reader and RFID tag for a reliable communication link between the two RFID devices. The range is affected by various factors, such as background radio frequency noise, surrounding structures that may affect the radio waves from the RFID reader, antenna configurations of the reader and tag, relative orientation (angle) between the reader and tag, and carrier frequency. RFID systems may operate in different frequency bands. In the low frequency (LF) band, a carrier frequency of 125 kHz or 134 kHz, for example, may provide a range up to 10 cm. In the high frequency (HF) band, a carrier frequency of 13.58 MHz, for example, may provide a range up to 1 meter. In the ultra high frequency (UHF) band, a carrier frequency within 860-960 MHz, for example, may provide a range up to 15 meters.

Figure 1:
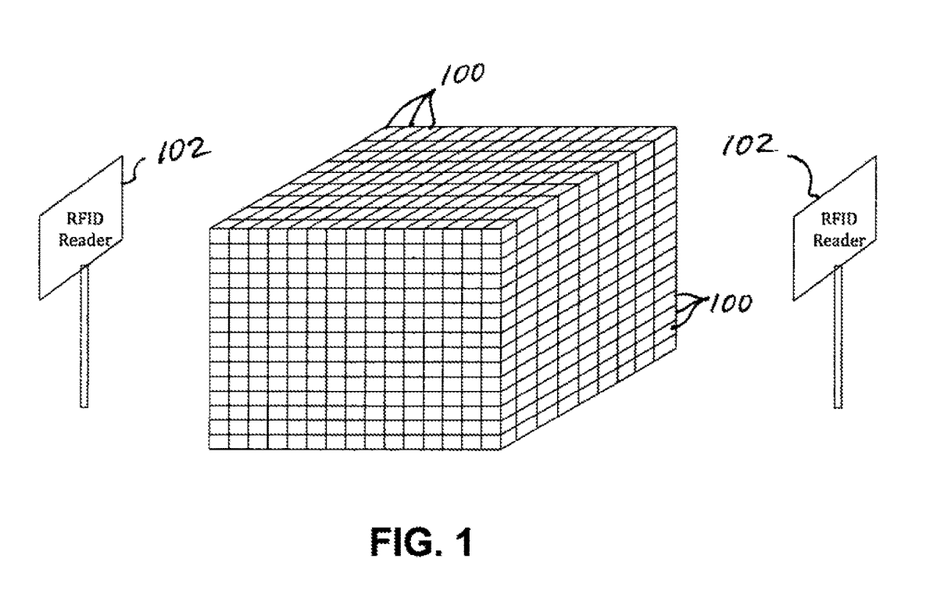
FIG. 1 is an isometric view showing an example RFID reading environment for which RFID tags may be modified to have increased range.

RFID tags are used on a great variety of articles. The articles can be items of clothing for sale in a retail shop, medical devices, and individual components used in a factory, just to name a few. Sometimes, RFID tags are scanned individually by an RFID reader at a relatively close range. At other times, the same RFID tags may need to be scanned by an RFID reader from far away. In FIG. 1 for example, many articles 100 each having an RFID tag may be grouped together for storage, and it may be desired to scan the RFID tags together as a group. Articles 100 may be stored on a pallet and transported together from a manufacturing facility to retail facility, for example. To track individual articles 100 during transportation, the entire group may be passed across an RFID screening station having one or more RFID readers 102 which are located further away than usual. To enable reliable communication, the RFID tags may be over-designed or conservatively designed to work in the most extreme situation that is expected during the useful life of the RFID tags, but such an approach may increase costs significantly. This scenario and others present a need for RFID tags that can be modified to suit the environment in which they will be scanned.

SUMMARY

Briefly and in general terms, the present invention is directed to a method for combining RFID tags.

In aspects of the invention, a method comprises obtaining a first RFID tag and a second RFID tag. The first RFID tag comprises a first chip and a first antenna configured to transmit data from the chip, and the first RFID tag has a first initial range. The second RFID tag comprises a second chip and a second antenna configured to transmit data from the chip, and the second RFID tag has a second initial range. The method comprises changing the first initial range of the first RFID tag to a first modified range by establishing a conductive path from first antenna to the second antenna, wherein the first modified range is greater than the first initial range.

The features and advantages of the invention will be more readily understood from the following detailed description which should be read in conjunction with the accompanying drawings.

DETAILED DESCRIPTION

Figure 2:
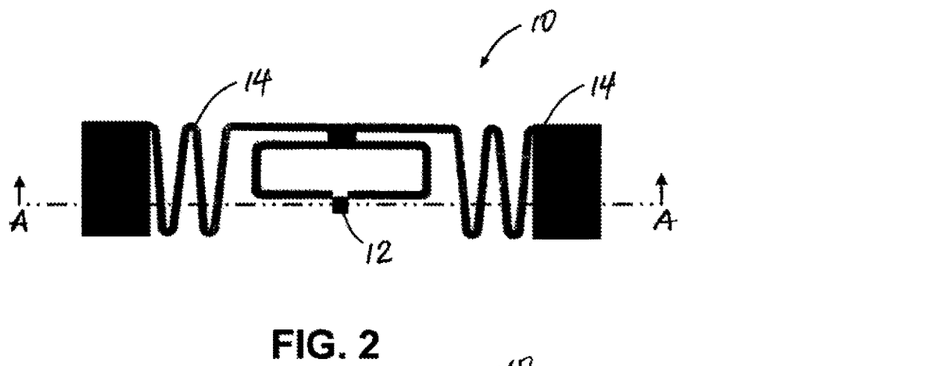
FIG. 2 is an interior plan view showing an example of a single RFID tag.

Referring now in more detail to the drawings for purposes of illustrating non-limiting examples, wherein like reference numerals designate corresponding or like elements among the several views, there is shown in FIG. 2 example RFID tag 10 comprising chip 12 and antenna 14 configured transmit data from the chip. Chip 12 is a silicon device (integrated circuit) having pads that are operatively connected to antenna 14, which is a conductive circuit. As used herein, the term "conductive" means electrically conductive. In the illustrated example, antenna 14 is a dipole (common for UHF) although other antenna designs are possible, such as coiled shapes (common for HF). Circuity provided by chip 12 may include modulators and voltage regulators, as known in the art. Chip 12 may have control logic that includes data encoding and decoding functions, as known in the art. Chip 12 includes memory, which may be an EEPROM for example, for storing information. Such information may be associated with an article on which the RFID tag will be attached at a later time. Chip 12 and antenna 14 are secured to a substrate, which may be made of paper (e.g., cardstock), polymer film, fabric, or other material.

RFID tag 10 will be modified to increase its reading range by connecting its antenna with that of another RFID tag. As used herein, the terms "connecting" and "connected" in the context of RFID antennas, refers to establishing a conductive path from antenna 14 of RFID tag 10 to the antenna of another RFID tag. The conductive path allows the connected antennas to form a circuit that that operates with chip 12 of RFID tag 10. In FIG. 2, RFID tag 10 is in an unmodified state. That is, RFID tag 10 is has not been combined with another RFID tag. Specifically, antenna 14 of RFID tag 10 has not been connected to the antenna of another RFID tag. While in an unmodified state, RFID tag 10 is functional in that it is capable of powering circuits of chip 12 in response radio waves from an RFID reader. RFID tag 10 has a range, which is the maximum distance between RFID tag 10 and an RFID reader for a reliable communication link between the tag and reader.

The term "initial range" refers to the range of RFID tag 10 while in its unmodified state. By definition, an initial range is greater than zero. The term "modified range" refers to the range of RFID tag 10 while in its modified state, which is the state in which RFID tag 10 is combined with one or more RFID tags by connecting antenna 14 of RFID tag 10 to the antennas of the other RFID tags.

The range of the RFID tag may be affected by variations in background radio frequency noise (electromagnetic interference), surrounding structures, and other conditions. Thus, the initial range may be determined by testing before RFID tag 10 is modified, such as by using a particular sensor using a known frequency and power under known test conditions (e.g., known amount of background RF noise, known orientation (angle) between reader and tag, etc.). For example, the sensor used for this purpose may be an RFID reader or other type of sensor.

Various test techniques may be used to determine the initial and modified ranges. In a technique referred to herein as position thresholding, the distance of the sensor from RFID tag 10 is adjusted while the sensor emits radio waves. The distance is adjusted until the radio waves induce RFID tag 10 to send a response to the sensor, or until the sensor detects a backscatter signal from the RFID tag. In a technique referred to herein as signal thresholding, the position of the sensor may be fixed (sensor does not move relative to the RFID tag) while characteristics of the radio waves from the antenna of the sensor are adjusted. The radio wave characteristics are adjusted until the radio waves induce RFID tag 10 to send a response to the sensor, or until the sensor detects a backscatter signal from the RFID tag. The radio wave characteristics that result in the response may be used, in formulas and models known in the art, to calculate a value of the initial range.

The initial range is relative to the modified range, which may be determined by testing after antenna 14 of RFID tag 10 is connected to the antenna of another RFID tag. Signal thresholding, position thresholding, or other test technique may be used to determine the modified range. For position thresholding, the sensor and test conditions to determine the modified range may be the same as or similar to those used to determine the initial range.

As indicated above, the range of RFID tag 10 depends on a variety of factors. Thus, values for the initial and modified ranges may vary depending on the sensor used for testing. For example, when using one type of sensor under certain test conditions, the initial and modified ranges may be 1.2 meters and 2 meters, respectively. When using another type of sensor under different test conditions, the initial and modified ranges may be 1.5 meters and 2.1 meters, respectively. The initial and modified ranges may be based on multiple tests, and the results of the tests may be averaged to determine initial and modified ranges.

Figures 3, 4:
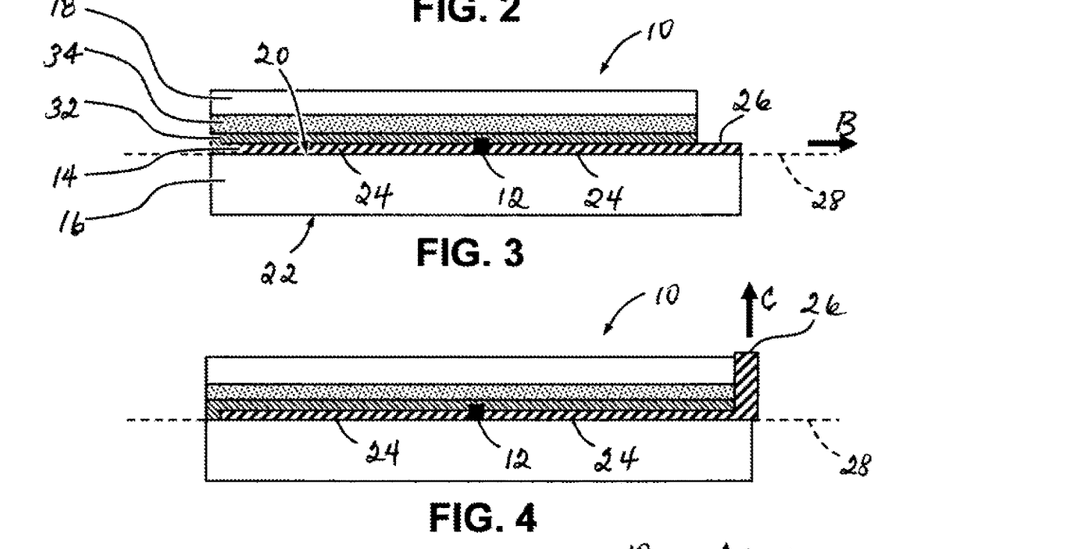
FIGS. 3-5 are cross-sectional side views along the direction of arrows A-A in FIG. 2, showing various example configurations of the RFID tag in an unmodified state.

FIG. 3 is a cross-section view in the direction of arrows A-A in FIG. 2. FIG. 3 shows an example configuration of RFID tag 10. RFID tag 10 is disposed between substrate 16 and cover 18. Substrate 16 may be made of paper (e.g., cardstock), polymer film, fabric, or other material. Chip 12 and antenna 14 are secured to interior surface 20 of substrate 16. Cover 18 may be made of paper (e.g., cardstock), polymer film, fabric, or other material. Cover 18 and substrate 16 may be made of the same material. Exterior surface 22 of substrate 16 will be secured to an article, such as a packaging container, item of clothing, a medical device, and a component used in a factory, etc. Covered portion 24 of antenna 14 is covered by cover 18. Exposed portion 26 of antenna 14 is not covered by cover 24. When RFID tag 10 is in its unmodified state, exposed portion 26 may be exposed to ambient air and/or is visible to a person. Substrate 16 forms plane 28 (represented by a dotted line in FIG. 3). Exposed portion 26 protrudes away from covered 24 portion in a direction (represented by arrow B) parallel to plane 28.

FIG. 4 is a cross-section view in the direction of arrows A-A in FIG. 2. FIG. 4 shows another example configuration of RFID tag 10. The configuration of FIG. 4 is the same as that of FIG. 3 except as follows. Exposed portion 26 protrudes away from covered 24 portion in a direction (represented by arrow C) perpendicular to plane 28.

Figure 5:
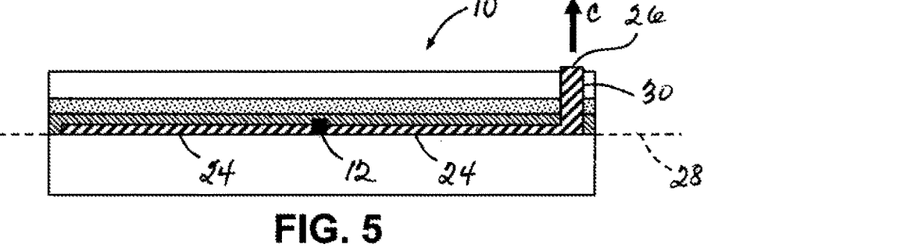

FIG. 5 is a cross-section view in the direction of arrows A-A in FIG. 2. FIG. 5 shows yet another example configuration of RFID tag 10. The configuration of FIG. 5 is the same as that of FIG. 4 except as follows. Exposed portion 26 extends through aperture 30 in cover 18.

Referring to FIGS. 3-5, coating 32 is optionally present. Coating 32 covers and contacts chip 12 and antenna 14. Coating 32 may be a thin film that protects the underlying electronic components from moisture, salt, chemicals, temperature changes, and other conditions that may damage the components. Adhesive 34 is optionally present. Adhesive 34 bonds cover 18 to coating 32. Adhesive 34 keeps RFID tag 10 sealed and protected between substrate 16 and cover 18.

Figure 6:
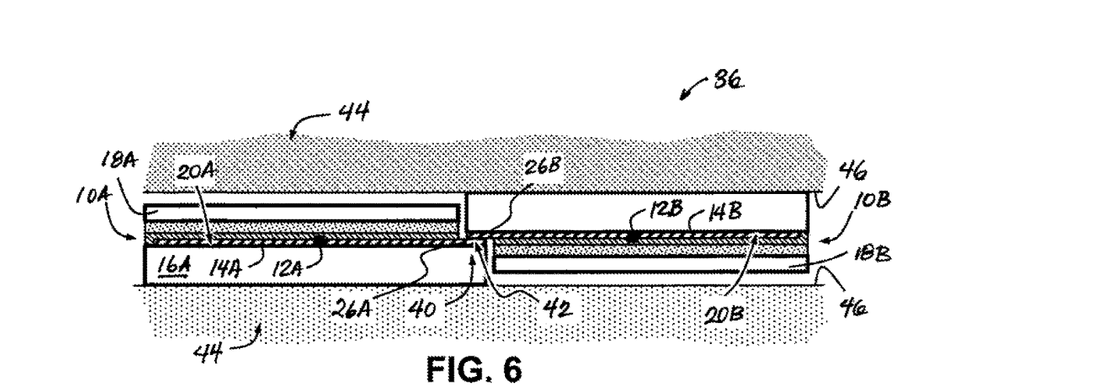
FIGS. 6-8 are cross-sectional side views showing RFID assemblies each comprising a pair of RFID tags in modified states in which a conductive path is established between antennas of the RFID tags in order to increase range of both RFID tags.
Figure 7:
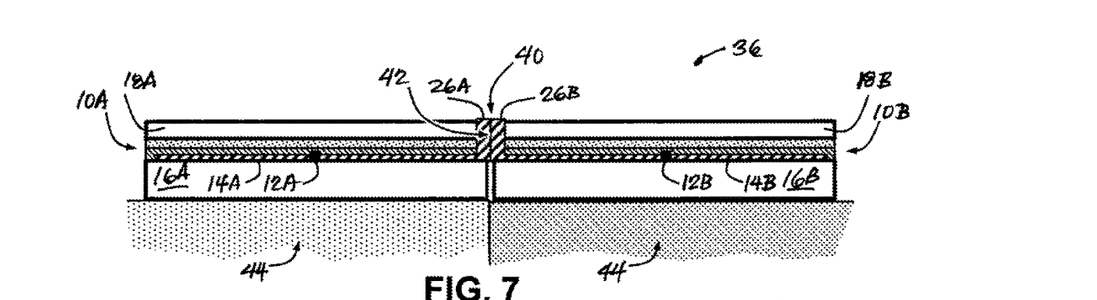
Figure 8:
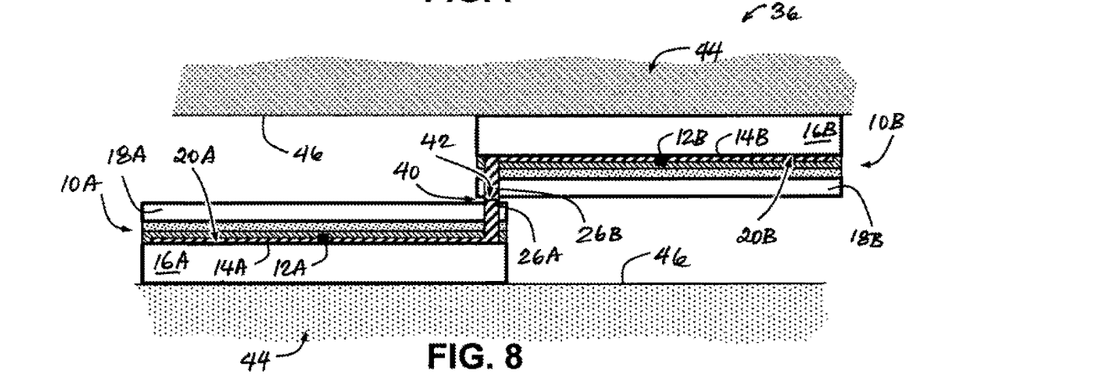

Each of FIGS. 6-8 shows a combined RFID tag assembly 36. Assembly 36 comprises two combined RFID tags having a conductive path between the RFID antennas. The RFID tags are secured to respective articles 44. The RFID tags in FIG. 6 are configured as in FIG. 3. The RFID tags in FIG. 7 are configured as in FIG. 4. The RFID tags in FIG. 8 are configured as in FIG. 5. Letters "A" and "B" are used with numerals to designate elements for the first and second RFID tags that correspond to the elements of FIGS. 2-5 having the same numerals. First RFID tag 10A comprises first chip 12A and first antenna 14A configured to transmit data from the first chip. Second RFID tag 10B comprises second chip 12B and second antenna 14B configured to transmit data from the second chip. Substrates 16A and 16B are distinct from each other, meaning that substrates 16A and 16B are not integral parts of the same substrate structure.

Covers 18A and 18B are distinct from each other, meaning that covers 18A and 18B are not integral parts of the same cover structure.

Conductive path 40 is present from first antenna 14A to second antenna 14B. Conductive path 40 is formed by exposed portion 26A of first antenna 14A being in contact with exposed portion 26B of second antenna 14B. Conductive path 40 is established without attaching a conductive material to first antenna 14A and second antenna 14B.

Conductive path 40 allows first antenna 14A and second antenna 14B to form a circuit that that operates with chip 12A of first RFID tag 10A. The antenna associated with chip 12A is effectively increased, which changes the initial range of first RFID tag 10A (referred to as a first initial range) to a modified range (referred to as a first modified range), which is greater than the initial range of first RFID tag 10A. Chip 12A uses first antenna 14A and second antenna 14B to transmit data stored in chip 12A. If first RFID tag 10A is a passive tag or semi-passive tag, radio waves incident on first antenna 14A and second antenna 14B provide power to chip 12A.

Likewise, the antenna associated with chip 12B is effectively increased, which changes the initial range of second RFID tag 10B (referred to as a second initial range) to a modified range (referred to as a second modified range), which is greater than the initial range of second RFID tag 10B. Chip 12B of second RFID tag 10B uses first antenna 14A and second antenna 14B to transmit data stored in chip 12B. If second RFID tag 10B is a passive tag or semi-passive tag, radio waves incident on first antenna 14A and second antenna 14B provide power to chip 12B.

Interface 42 exists at an area of contact between exposed portion 26A and exposed portion 26B. Interface 42 is defined by a change in material composition and/or mechanical characteristics. For example, exposed portion 26A may be made of a composition of copper and a first type of binding agent, and exposed portion 26B may be made of a composition of copper and a second type of binding agent. Thus, interface 42 is a change in material composition. In a second example, exposed portion 26A and exposed portion 26B are not fused or melted together. This may be evident from a seam or discontinuity where a surface of exposed portion 26A abuts a surface of exposed portion 26B. Thus, in the second example, interface 42 is a change in mechanical characteristic due to the presence of a seam or discontinuity. A change in mechanical characteristics may also be present in the first example.

In FIGS. 6 and 8, interior surface 20A (an example of a first surface) of substrate 16A of first RFID tag 10A faces toward interior surface 20B (an example of a second surface) of substrate 16B of first RFID tag 10B. First RFID tag 10A is attached to wall 46 of first article 44, and second RFID tag 10B is attached to wall 46 of second article 44, which is distinct from the first article. Wall 46 of the first article faces wall 46 of the second article. The articles may be boxes made of paper (e.g., cardboard), plastic, or other material.

Figure 9:
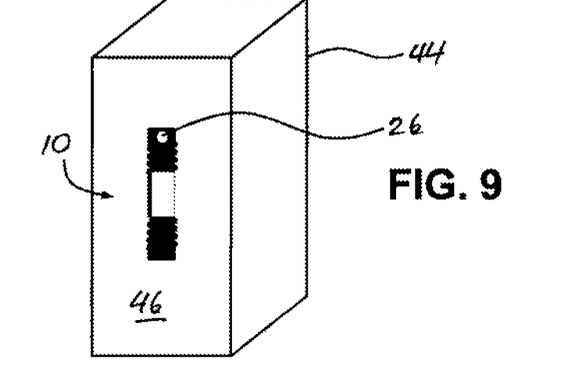
FIGS. 9-11 are isometric views showing examples of how an RFID tag may be secured to an article to allow a conductive path to be established later with or without the addition of a conducive material to the antenna of the RFID tag.
Figure 10:
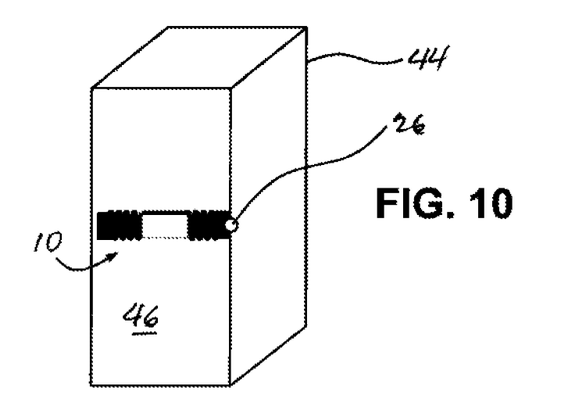
Figure 11:
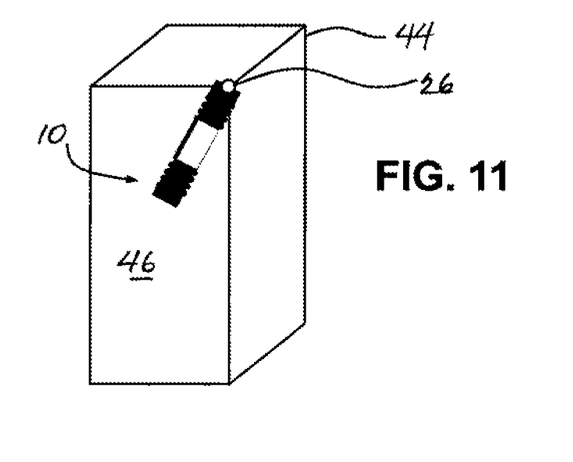

As shown in FIGS. 9-11, RFID tag 10 may be attached to article 44 in various ways. Attachment may be accomplished by fixing exterior surface 22 of substrate 16 to wall 46 of article 44. When RFID tags are secured to respective articles 44 such that exposed portions 26 are at a central area of article wall 46 as shown in FIG. 9, a conductive path between antennas of two RFID tags may be established by moving one article closer to the another article, more specifically by moving walls 46 closer together. The result would be an RFID assembly comprising two combined RFID tags.

When RFID tags are secured to respective articles 44 such that exposed portions 26 are at an edge of article wall 46 as shown in FIG. 10, a conductive path between the antennas of four RFID tags may be established by moving four articles closer together, more specifically by moving respective edges of walls 46 closer together. The result would be an RFID assembly comprising four combined RFID tags.

When RFID tags are secured to respective articles 44 such that exposed portions 26 are at a corner of article wall 46 as shown in FIG. 11, a conductive path between the antennas of eight RFID tags may be established by moving eight articles closer together, more specifically by moving respective corners of walls 46 closer together. The result would be an RFID assembly comprising eight combined RFID tags.

Figure 12A:
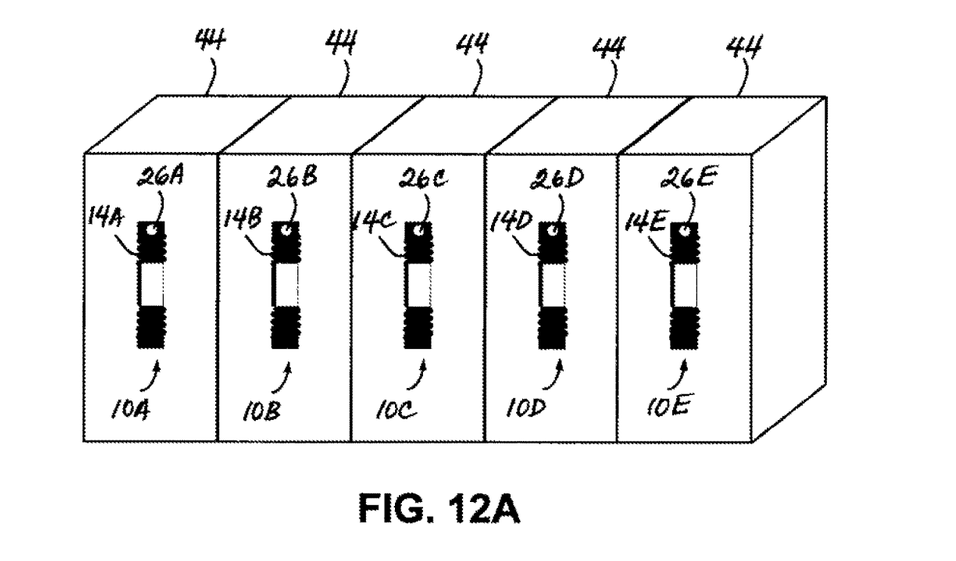
FIGS. 12A and 12B are isometric view showing an example of how a conductive path may be established by the addition of a conducive material to the antennas of RFID tags.
Figure 12B:
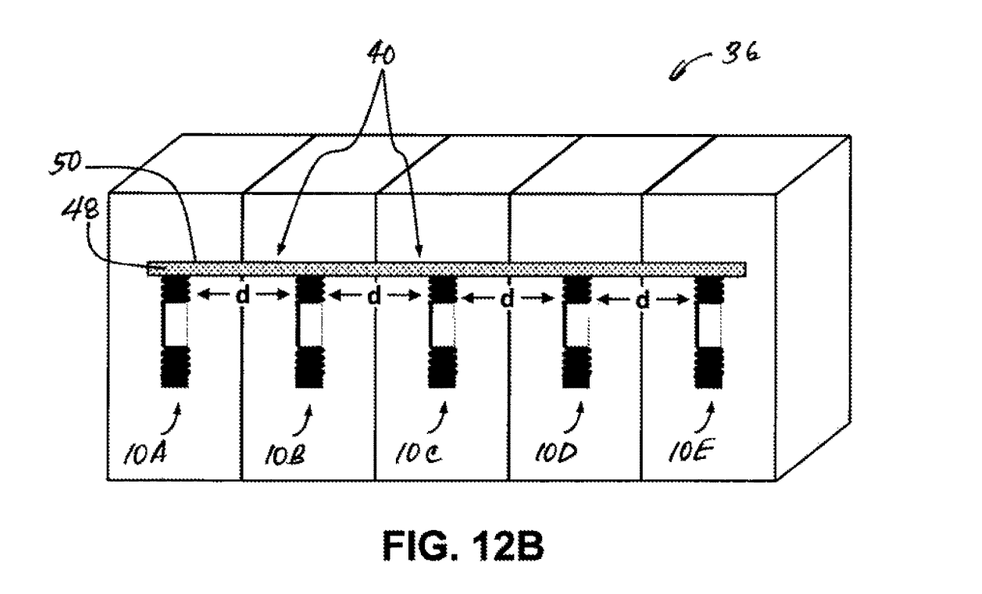

In FIGS. 12A and 12B, letters "A" through "E" are used with numerals to designate elements for a plurality of RFID tags that correspond to the elements of FIGS. 2-5 having the same numerals. As shown in FIGS. 12A and 12B, conductive path 40 is formed by attaching conductive material 48 to respective antennas 14 of RFID tags 10A through 10E. FIG. 12B shows Combined RFID tag assembly 36 that results after conductive material 48 is attached to the RFID tags of FIG. 12A. Conductive material 48 provides conductive path 40 between respective exposed surfaces 26. After establishing conductive path 40, antennas 14 are separated by distances d, and conductive material 48 forms a conductive bridge across distances d.

Conductive material 48 may be a metal foil or metal particles bound by a binder agent, for example. Conductive material 48 may be carried by tape 50, such that attaching conductive material 48 to antennas 14 includes applying tape 50 over antennas 14. For example, tape 50 may include a strip of paper or polymer film and an adhesive at secures conductive material 48 onto exposed portions 26 and secures articles 44 together. Tape 50 may be removed or cut in order to separate articles 44 later.

Figure 13:
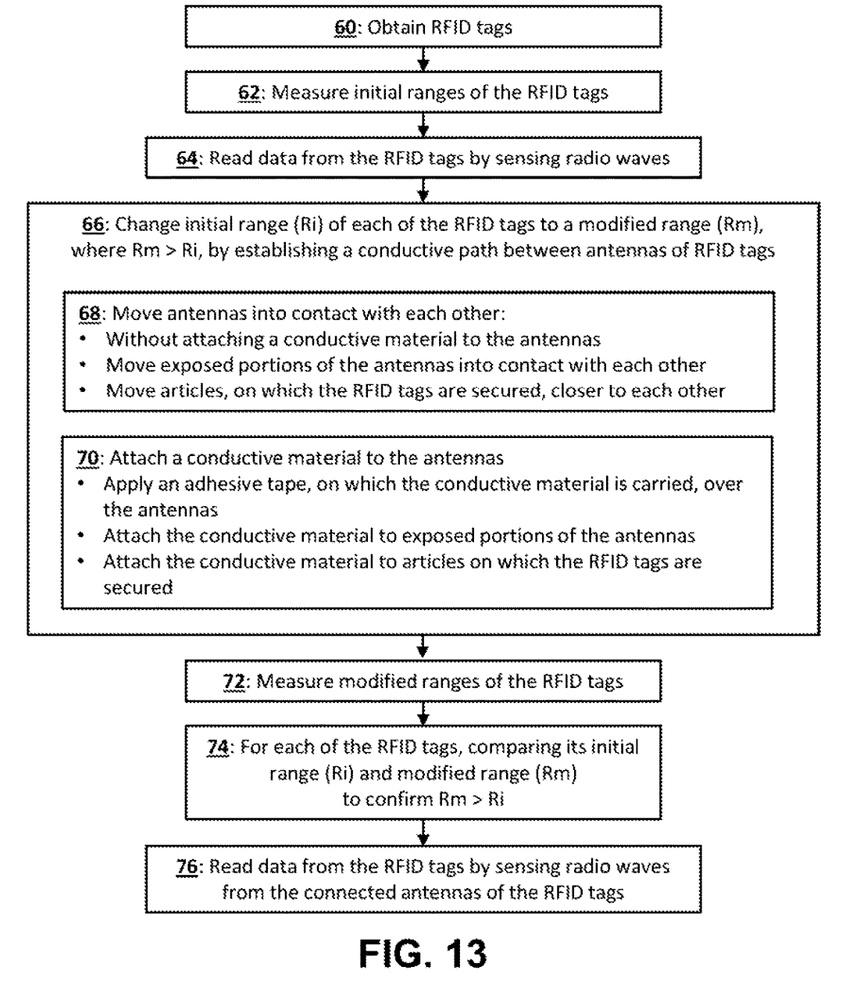
FIG. 13 is a flow diagram showing an example process for combining RFID tags

FIG. 13 shows an example process for combining RFID tags. Combining RFID tags results in modification the RFID tags. The process may begin with obtaining RFID tags (block 60) and then changing the initial range (Ri) of each of the RFID tags to a modified range (Rm) greater than the initial range (block 66). The change in range is performed by establishing a conductive path between the antennas of the RFID tags.

Optionally, before the range is changed, the initial ranges (Ri) of the RFID tags are measured (block 62). This step may allow for later confirmation that Rm>Ri. This step may be performed by using an RFID reader or other type of sensor, as previously described.

Optionally, before the range is changed, radio waves are used to read data from the RFID tags (block 64). This step may be performed to confirm that the RFID tags are functional and/or to identify articles on which the RFID tags are secured. This step may be performed by using an RFID reader.

Establishing the conductive path (block 66) may be performed by moving antennas of the RFID tags into contact with each other (block 68). Such contact may be accomplished by any one or a combination of: without attaching a conductive material to the antennas; by moving exposed portions of the antennas into contact with each other; and moving articles, on which the RFID tags are secured, closer to each other.

Establishing the conductive path (block 66) may be performed by attaching a conductive material to the antennas (block 70). Attaching the conductive material may be accomplished by any one or a combination of: applying an adhesive tape, on which the conductive material is carried, over the antennas; attaching the conductive material to exposed portions of the antennas; and attaching the conductive material to articles on which the RFID tags are secured.

Optionally, after the range is changed, the modified ranges of the RFID tags are measured (block 72). For each of the RFID tags, the initial range (Ri) and modified range (Rm) of the RFID tag are compared (block 74). This step allows for confirmation that Rm>Ri. This step may be performed by using an RFID reader or other type of sensor, as previously described.

Optionally, after the range is changed, radio waves are used to read data from the RFID tags (block 76). This step may be performed to confirm that the modified RFID tags are functional and/or to identify articles on which the RFID tags are secured. This step may be performed by using an RFID reader.

FIGS. 2-12B show a type of passive RFID tag. It is contemplated that other types of passive RFID tags may be combined as described herein. It is contemplated that modification of range by connecting antennas may be formed for semi-passive and active RFID tags.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in order to form varying modes of the invention. Accordingly, it is not intended that the invention be limited, except as by the appended claims.

What is claimed is:

1. A method for combining RFID tags, the method comprising:
    obtaining a first RFID tag comprising a first chip and a first antenna configured to transmit data from the chip, the first RFID tag having a first initial range;
    obtaining a second RFID tag comprising a second chip and a second antenna configured to transmit data from the chip, the second RFID tag having a second initial range; and
    changing the first initial range of the first RFID tag to a first modified range by establishing a conductive path from first antenna to the second antenna, wherein the first modified range is greater than the first initial range,
    wherein the establishing of the conductive path is performed
        by moving the first antenna into direct physical contact with the second antenna or
        by attaching a conductive material to the first antenna and the second antenna, the conductive material comprising metal.

2. The method of claim 1, wherein the establishing of the conductive path is performed by moving the first antenna into direct physical contact with the second antenna.

3. The method of claim 2, wherein the establishing of the conductive path is performed without attaching a conductive material to the first antenna and the second antenna.

4. The method of claim 2, wherein:
    before the establishing of the conductive path, the first RFID tag is disposed between a first substrate and a first cover, a covered portion of the first antenna is covered by the first cover, and an exposed portion of the first antenna is not covered by the first cover;
    before the establishing of the conductive path, the second RFID tag is disposed between a second substrate and a second cover, a covered portion of the second antenna is covered by the second cover, and an exposed portion of the second antenna is not covered by the second cover; and
    the moving of the first antenna into contact with the second antenna includes moving the exposed portion of the first antenna into contact with the exposed portion of the second antenna.

5. The method of claim 2, wherein:
    the first RFID tag is attached to a first article before the establishing of the conductive path,
    the second RFID tag is attached to a second article before the establishing of the conductive path, and
    the moving of the first antenna into contact with the second antenna includes moving the first article closer to the second article.

6. The method of claim 1, wherein the establishing of the conductive path is performed by attaching a conductive material to the first antenna and the second antenna, and after the establishing of the conductive path, the first antenna and the second antenna are separated by a distance, and the conductive material forms a conductive bridge across the distance.

7. The method of claim 6, wherein:
    before the establishing of the conductive path, the first RFID tag is disposed between a first substrate and a first cover, a covered portion of the first antenna is covered by the first cover, and an exposed portion of the first antenna is not covered by the first cover;
    before the establishing of the conductive path, the second RFID tag is disposed between a second substrate and a second cover, a covered portion of the second antenna is covered by the second cover, and an exposed portion of the second antenna is not covered by the second cover; and
    the attaching of the conductive material to the first antenna and the second antenna includes attaching the conductive material to the exposed portion of the first antenna and the exposed portion of the second antenna.

8. The method of claim 6, wherein:
    the first RFID tag is attached to a first article before the establishing of the conductive path,
    the second RFID tag is attached to a first article before the establishing of the conductive path, and
    the attaching of the conductive material to the first antenna and the second antenna includes attaching the conductive material to the first article and the second article.

9. The method of claim 6, wherein the conductive material is carried by an adhesive tape, and the attaching of the conductive material to the first antenna and the second antenna includes applying the adhesive tape over the first antenna and the second antenna.

10. The method of claim 1, further comprising:
    measuring the first initial range and the second initial range before the establishing of the conducive path.

11. A method for combining RFID tags, the method comprising:
    obtaining a first RFID tag comprising a first chip and a first antenna configured to transmit data from the chip, the first RFID tag having a first initial range;

obtaining a second RFID tag comprising a second chip and a second antenna configured to transmit data from the chip, the second RFID tag having a second initial range;

changing the first initial range of the first RFID tag to a first modified range by establishing a conductive path by directly physically connecting the first antenna to the second antenna, wherein the first modified range is greater than the first initial range; and measuring the first modified range after the establishing of the conductive path.

12. The method of claim 11, further comprising:

measuring the first initial range before the establishing of the conductive path; and comparing measured first initial range and the measured first modified range to confirm that the first modified range is greater than the first initial range.

13. The method of claim 1, wherein the establishing of the conductive path changes the second initial range of the second RFID tag to a second modified initial range that is greater than the second initial range.

14. The method of claim 13, further comprising:

measuring the second modified range after the establishing of the conductive path.

15. The method of claim 14, further comprising:

measuring the second initial range before the establishing of the conductive path; and comparing measured second initial range and the measured second modified range to confirm that the second modified range is greater than the second initial range.

16. A method for combining RFID tags, the method comprising:

obtaining a first RFID tag comprising a first chip and a first antenna configured to transmit data from the chip, the first RFID tag having a first initial range;

obtaining a second RFID tag comprising a second chip and a second antenna configured to transmit data from the chip, the second RFID tag having a second initial range; and changing the first initial range of the first RFID tag to a first modified range by establishing a conductive path from first antenna to the second antenna, wherein the first modified range is greater than the first initial range, wherein the first RFID tag is disposed between a first substrate and a first cover before the establishing of the conductive path, a covered portion of the first antenna is covered by the first cover, and an exposed portion of the first antenna is not covered by the first cover;

the second RFID tag is disposed between a second substrate and a second cover before the establishing of the conductive path, a covered portion of the second antenna is covered by the second cover, and an exposed portion of the second antenna is not covered by the second cover; and the establishing of the conductive path is performed by establishing a conductive path from the exposed portion of the first antenna to the exposed portion of the second antenna.

17. The method of claim 1, further comprising:

reading data from the first RFID tag by sensing radio waves from the first antenna before the establishing of the conductive path; and reading data from the first RFID tag by sensing radio waves from the first antenna and the second antenna after the establishing of the conductive path.

18. The method of claim 17, further comprising:

reading data from the second RFID tag by sensing radio waves from the second antenna before the establishing of the conductive path; and reading data from the second RFID tag by sensing radio waves from the first antenna and the second antenna after the establishing of the conductive path.

* * * * *